United States Patent
Komori et al.

(10) Patent No.: US 7,401,970 B2
(45) Date of Patent: Jul. 22, 2008

(54) FLUID MIXING REACTION ENHANCEMENT METHOD USING MICRO DEVICE, AND MICRO DEVICE

(75) Inventors: Satoru Komori, Kyoto (JP); Yasumasa Ito, Kyoto (JP)

(73) Assignee: FUJIFILM Corporation, Tokyo (JP)

( * ) Notice: Subject to any disclaimer, the term of this patent is extended or adjusted under 35 U.S.C. 154(b) by 455 days.

(21) Appl. No.: 10/928,733

(22) Filed: Aug. 30, 2004

(65) Prior Publication Data

US 2005/0058014 A1   Mar. 17, 2005

(30) Foreign Application Priority Data

Aug. 29, 2003  (JP) ............................. 2003-307065

(51) Int. Cl.
 *B01F 11/00* (2006.01)
(52) U.S. Cl. ...................... 366/108; 366/116; 366/128; 366/154.2; 366/DIG. 4
(58) Field of Classification Search ................ 366/110, 366/111, 112, 116, 128, 275, DIG. 4, 108, 366/154.2
See application file for complete search history.

(56) References Cited

U.S. PATENT DOCUMENTS

| | | | | |
|---|---|---|---|---|
| 2,585,103 A * | 2/1952 | Fitzgerald | .................... | 99/451 |
| 2,701,708 A * | 2/1955 | Keen | .......................... | 366/219 |
| 3,153,530 A * | 10/1964 | Bodine | ........................ | 366/124 |
| 3,165,299 A * | 1/1965 | Balamuth et al. | ........... | 366/118 |
| 3,622,286 A * | 11/1971 | Gaddy | ........................ | 451/113 |
| 3,743,523 A * | 7/1973 | Bodine | ........................ | 426/238 |
| 3,780,992 A * | 12/1973 | Nishi et al. | .................. | 366/114 |
| 4,352,570 A * | 10/1982 | Firth | .......................... | 366/127 |
| 4,576,924 A * | 3/1986 | Koch et al. | .................... | 502/56 |
| 4,610,546 A * | 9/1986 | Intraub | ........................ | 366/110 |
| 5,769,537 A * | 6/1998 | Stromberg et al. | ........ | 366/163.1 |
| 6,244,738 B1 * | 6/2001 | Yasuda et al. | ................ | 366/114 |
| 2003/0107946 A1 | 6/2003 | Cosby et al. | | |
| 2004/0257907 A1 * | 12/2004 | Xu et al. | ....................... | 366/127 |

FOREIGN PATENT DOCUMENTS

| | | |
|---|---|---|
| EP | 1 486 780 A1 | 12/2004 |
| WO | WO 99/44736 A1 | 9/1999 |
| WO | WO 02/089965 A1 | 11/2002 |
| WO | WO 03/071262 A1 | 8/2003 |

* cited by examiner

*Primary Examiner*—Tony G Soohoo
(74) *Attorney, Agent, or Firm*—Sughrue Mion, PLLC

(57) ABSTRACT

A micro device which makes a plurality of fluids mixedly react while circulating these fluids as a thin-film laminar flow by joining these fluids into one microchannel through respective fluid supply passes to induce a velocity fluctuation in a microchannel longitudinal direction of the fluids by propagating infralow frequency vibration at a vibration frequency of 50 Hz or more and 1 kHz or less to the fluids which flow through the inside of the microchannel.

5 Claims, 8 Drawing Sheets

(CASE OF NOT GIVING VIBRATION)

(CASE OF GIVING VIBRATION)

FLUID MIXING REACTION ENHANCEMENT METHOD USING MICRO DEVICE, AND MICRO DEVICE

BACKGROUND OF THE INVENTION

This application claims the priority of Japanese Patent Application No.2003-307065 filed on Aug. 29, 2003, in the Japan Patent Office, the disclosure of which is incorporated by reference.

1. Field of the Invention

The present invention relates to a fluid mixing reaction enhancement method using a micro device, and a micro device, and in particular, relates to a fluid mixing reaction enhancement method using a micro device, and a micro device which can enhance a mixing reaction of fluids, which flow through the inside of a microchannel, without complicating microchannel structure and extending the microchannel.

2. Description of the Related Art

Since it is possible to perform micro fabrication in remarkably good accuracy and low cost owing to the development of processing technology in recent years, the development of apparatuses such as a mixing apparatus (micro mixer) and a chemistry reactor (micro reactor), which are in micro scale, and furthermore, a micro TAS (Total Analysis System: lab-on-a-chip) and a microchemistry plant have been attempted. These apparatuses, where minute spaces (hereinafter, "microchannels") with opening widths in micron order which are connected to a plurality of fine fluid supply passes are provided, mix a plurality of fluids or perform reactions accompanied by mixing. It is common that the apparatuses such as the micro mixer, micro device, micro TAS, and microchemistry plant which are mentioned above have the above-mentioned basic structure of a microchannel, and hence, these apparatuses will be generically called micro devices in the present invention.

The micro device has unique advantages, which batch-scale operations do not have, such as the capability of operations, such as dissociation, analysis, and extraction, in a short time wit a small amount of samples by mixing or a mixing reaction of a plurality of fluids, the capability of quickly adapting for chemical production requiring job shop type production, the ease of numbering-up because of a small apparatus, and adaptability for dangerous reactions such as explosions.

Although a flow in a microchannel used as the fundamental of these micro devices is usually in a laminar flow state, its efficiency is low because a mixing reaction of fluids proceeds only by molecular diffusion in this case. Hence, it is necessary to terminate a mixing reaction for a short time by a certain method in most of mixing reactions except cases of requiring a maturation mixing reaction for a long time. Hence, it is very important practically to clarify a mixing reaction mechanism of fluids in a flow field in a microchannel, and to propose a method for enhancing a mixing reaction.

When reactants are supplied in mutually complete isolation in a flow field in a state that reactants are not mixed beforehand, that is, in a so-called initial state, a chemical reaction proceeds through molecular diffusion in a contact interface domain of the fluids containing respective reactants. Hence, in order to enhance the fluid mixing and chemical reaction in a general practical reactor, it becomes important not only how fast materials are transported, but also how a contact interface is deformed intricately. However, since the flow in the microchannel, which is a flow field is in a laminar flow state, there is no complexity in a contact interface, and hence, attentions have been paid on how to earn the molecule diffusion time of materials, For this reason, in regard to conventional micro devices, passive methods of attempting to increase the contact time of fluids, and the contact interface between fluids, have been adopted by complicating channel shapes, and extending the channels as a way of enhancing the mixing reaction of the fluids (for example, PCT International Publication WO 99/44736, and PCT International Publication WO 02/089965).

SUMMARY OF THE INVENTION

However, as described above, since the opening width is a minute space in micron order in a microchannel of the micro device, a reaction product adheres to a wall surface in the microchannel and scale is easily generated, as a shape of the microchannel is complicated or is lengthened. Hence, since it is easy to generate clogging of the microchannel, and the like, the micro device has a defect that maintenance becomes hard.

In addition, since a flow within the microchannel at the time of using this passive method is a laminar flow after all and the driving force of material transport is only the molecular diffusion of materials, there is a limitation also in an enhancing effect of a mixing reaction.

The present invention is devised in consideration of such circumstances, and aims at providing a fluid mixing reaction enhancement method using a micro device, and a micro device which can exponentially enhance the mixing and a reaction of fluids, which flow through the inside of a microchannel, without complicating the microchannel structure and extending the microchannel.

After the wholehearted study about the mixing reaction enhancement technology in a micro device, the present inventor discovered that there is a close relationship between the mixing rate, at which a plurality of fluids which flow through the inside of a microchannel mixes, and the velocity fluctuation of the fluids, which flow through the inside of the microchannel, in the microchannel longitudinal direction, and hence, it is possible to obtain an approximately perfect mixing rate by enlarging the strength of velocity fluctuation. Furthermore, the present inventor discovered that, in order to enlarge the strength of velocity fluctuation, it is preferable to deliver the infralow frequency vibration at a vibration frequency of at least 50 Hz and less than 1 kHz, and preferably, at least 50 Hz and 300 Hz or less to the fluids which flow through the inside of the microchannel. The present invention is devised on the basis of such knowledge.

A first aspect of the present invention is a fluid mixing reaction enhancement method using a micro device which makes a plurality of fluids mixedly reacted by joining these fluids into one microchannel after passing these fluids through each fluid supply pass, comprising: inducing a velocity fluctuation in a microchannel longitudinal direction in the fluids by propagating the infralow frequency vibration at a frequency of 50 Hz or more and less than 1 kHz to the fluids which flow through the inside of the above-described microchannel.

Here, the mixing reaction not only includes the case of aiming at mixing fluids, and the case of aiming at enhancing a reaction accompanied by mixing, but also includes the case of aiming at separating, analyzing, or extracting materials eventually by performing the mixing or mixing reaction.

According to the first aspect of the present invention, the flow rate is varied in the microchannel longitudinal direction in fluids by propagating the infralow frequency vibration at a vibration frequency of at least 50 Hz and less than 1 kHz to the fluids which flow through the inside of the microchannel. It is possible to exponentially raise a degree of mixing of a plurality of fluids, which flow through the inside of the microchannel, by the velocity fluctuation of the fluids in this microchannel longitudinal direction. Hence, it is possible to exponentially enhance the mixing and reaction of fluids, which flow through the inside of the microchannel, without complicating the microchannel structure or extending the microchannel.

A second aspect of the present invention is characterized in that the vibration frequency is at least 50 Hz and 300 Hz or less. Thereby, it is possible to achieve the miniaturization and reduction of power consumption of a vibration source which is important when the vibration source is mounted on the micro device, and hence, it is possible to use, for example, a miniature motor for models.

A third aspect of the present invention is characterized by further comprising: quantitatively evaluating a mixed state in the microchannel based on a velocity fluctuation strength of the variation induced to the fluids, the velocity fluctuation strength defined by a square root of a time mean of square of $u_f(t)$:

$$\sqrt{\overline{u_f^2}}$$

where $u_f(t)$ represents a velocity fluctuation of fluids flowing through the inside of the microchannel in a microchannel longitudinal direction at time t; and based on the evaluation result, controlling the vibration frequency within a range of the frequency which is at least 50 Hz and less than 1 kHz so that the velocity fluctuation strength can be maximized.

The third aspect of the present invention quantitatively evaluates the mixed state of fluids in the microchannel at the time of performing the fluid mixing reaction enhancement method using the micro device of the first aspect by the velocity fluctuation strength, and controls the vibration frequency so that the velocity fluctuation strength becomes maximum from the evaluation result. That is, since it is possible to quantitatively obtain the mixed state by the strength of velocity fluctuation which directly governs the degree of mixing of the fluids which flow through the inside of the microchannel, it is possible to exactly evaluate the mixed state of the fluids in the microchannel. Hence, even if mixing rates of fluids in a microchannel differ because of differences in physical properties of the fluids to be used, conditions, etc. when the fluid mixing reaction enhancement method using a micro device of the first aspect is performed, it is possible to control the vibration frequency at a vibration frequency within a range of 50 Hz or more and less than 1 kHz, at which the degree of mixing becomes optimal, by investigating the velocity fluctuation strength. In this case, the vibration frequency may be controlled so that the velocity fluctuation strength divided by a mean flow rate in a cross section of the microchannel for a dimensionless analysis may become 25 or more, and preferably, 30 or more.

A fourth aspect of the present invention is characterized by further comprising: inducing velocity fluctuation in fluids which flow through the inside of the microchannel by vibrating a tube coupled to the fluid supply passes; quantitatively evaluating a mixed state in the microchannel based on a vibration speed variation strength of a tube, the vibration speed variation strength defined by the square root of a sum of time means of square of $u_t(t)$ and square of $v_t(t)$:

$$\sqrt{\overline{u_t^2} + \overline{v_t^2}}$$

where $u_t(t)$ and $v_t(t)$ represent, respectively, horizontal speed variation of the tube and vertical speed variation of the tube, which are obtained by performing time differentiation of displacements of the tubes in a horizontal direction and a vertical direction respectively; and based on the evaluation result, controlling the vibration frequency within a range of the frequency which is at least 50 Hz and less than 1 kHz so that the velocity fluctuation strength can be maximized.

The fourth aspect quantitatively evaluates the mixed state of fluids in the microchannel by the vibration speed variation strength at the time of performing the fluid mixing reaction enhancement method by inducing a velocity fluctuation in fluids, which flow through a microchannel, by vibrating tubes coupled to fluid supply passes respectively, and controls the vibration frequency so that the vibration speed variation strength can be maximized based on the evaluation result. That is, since it is possible to quantitatively obtain the mixed state by the vibration speed variation strength of tubes having a clear correlation with the velocity fluctuation strength explained in the third aspect, it is possible to exactly evaluate the mixed state of both the fluids in the microchannel. Hence, even if mixing rates of fluids in a microchannel differ because of differences in physical properties of the fluids to be used, conditions, etc. when the fluid mixing reaction enhancement method using a micro device of the first aspect is performed, it is possible to control the vibration frequency at a vibration frequency within a range of at least 50 Hz and less than 1 kHz, at which the degree of mixing becomes optimal, by investigating the vibration speed variation strength. In this case, the vibration frequency may be controlled so that the vibration speed variation strength of tubes divided by a mean flow rate in a cross section of the microchannel for a dimensionless analysis may become 50 or more, and preferably, 60 or more.

In addition, in order to achieve the above-described objects, a fifth aspect of the present invention is a micro device which makes a plurality of fluids mixedly reacted by joining these fluids into one microchannel after passing these fluids through each fluid supply pass, comprising a velocity fluctuation induction device which induces velocity fluctuation in the above-described microchannel longitudinal direction in fluids which flow through the inside of the above-described microchannel.

According to this aspect of the present invention, since the velocity fluctuation induction device to induce the velocity fluctuation in a microchannel longitudinal direction to the fluids which flow through the inside of the microchannel is provided, it is possible to exponentially raise the degree of mixing of the plurality of fluids which flows through the inside of the microchannel. Hence, it is possible to exponentially enhance the mixing and reaction of fluids, which flow through the inside of the microchannel, without complicating the microchannel structure or extending the microchannel.

A sixth aspect is characterized in that the velocity fluctuation induction device comprises a plurality of tubes which is connected to a plurality of fluid supply passes respectively, and supplies respective fluids to the fluid supply passes, and an infralow frequency vibration generating device which generates the infralow frequency vibration of a frequency which is at least 50 Hz and less than 1 kHz in at least one of the plurality of tubes.

The sixth aspect is what shows an example of a preferable velocity fluctuation induction device, respective tubes are connected to a plurality of fluid supply passes, and the infralow frequency vibration at a frequency which is at least 50 Hz and less than 1 kHz is generated in this tube. It is considered that a mechanism of enhancement of a mixing reaction of fluids, which flow through the inside of the microchannel, owing to this is to generate the infralow frequency vibration at a frequency which is at least 50 Hz and less than 1 kHz in the tube to induce the pressure variation of the fluid in the tube, and to induce a strong velocity fluctuation in the microchannel by propagating the pressure variation as an infralow frequency vibration in the microchannel. It is considered that the mixing reaction is enhanced by the instability near a junction where a plurality of fluids join into the microchannel by this strong velocity fluctuation.

A seventh aspect is characterized in that the infralow frequency vibration generating device comprises a pair of supporting members which supports at least one tube among the plurality of tubes in a longitudinal direction with keeping a predetermined gap, a vibrating beam with cantilever structure which is provided between the pair of supporting members and supports the at least one tube in midair, and a miniature motor which is mounted in a front end part of the vibrating beam and around a motor shaft of which an eccentric weight is installed, and wherein mechanical vibration is given to the tube, supported by the above-mentioned vibrating beam, by integrally vibrating the above-mentioned miniature motor with the above-mentioned vibrating beam by rotating the above-mentioned eccentric weight by the above-mentioned miniature motor.

A seventh aspect shows a preferable infralow frequency vibration generating device for generating the infralow frequency vibration at a frequency, which is at least 50 Hz and less than 1 kHz, in a tube, and mechanically generates infralow frequency vibration in the tube, supported by a vibrating beam, by rotating an eccentric weight by a miniature motor, having the eccentric weight on its own motor shaft, such as a miniature motor for models. So long as it is an infralow frequency vibration generating device which can generate the infralow frequency vibration at a frequency of at least 50 Hz and less than 1 kHz in a fluid which flows through a microchannel, it is also possible to use other devices such as an electromagnetic shaker which can perform ON-OFF operation at a constant frequency. Nevertheless, as described above, since it is important that the infralow frequency vibration-generating device mounted in a micro device is small and consumes low power, it is preferable to adopt a device of integrally vibrating a tube with vibrating a miniature motor, rotating an eccentric weight, and a vibrating beam like the seventh aspect.

An eighth aspect is characterized in that the opening width of the above-mentioned microchannel is at least 10 μm and no more than 1000 μm. This specifically shows the scale of the preferable opening width of the microchannel which is a minute space.

As explained above, the fluid mixing reaction enhancement method using a micro device, and the micro device of the present invention can exponentially enhance the mixing and reaction, accompanied with mixing, of fluids, which flow through the inside of a microchannel, without complicating the microchannel structure and extending the microchannel.

BRIEF DESCRIPTION OF THE DRAWINGS

The above and other objects and features of the present invention will become apparent from the following description of exemplary embodiments of the present invention given in conjunction with the accompanying drawings, in which.

DETAILED DESCRIPTION OF THE PREFERRED EMBODIMENTS

Hereafter, exemplary embodiments of a fluid mixing reaction enhancement method using a micro device, and a micro device which relate to the present invention will be explained according to the accompanying drawings.

Figure 1:
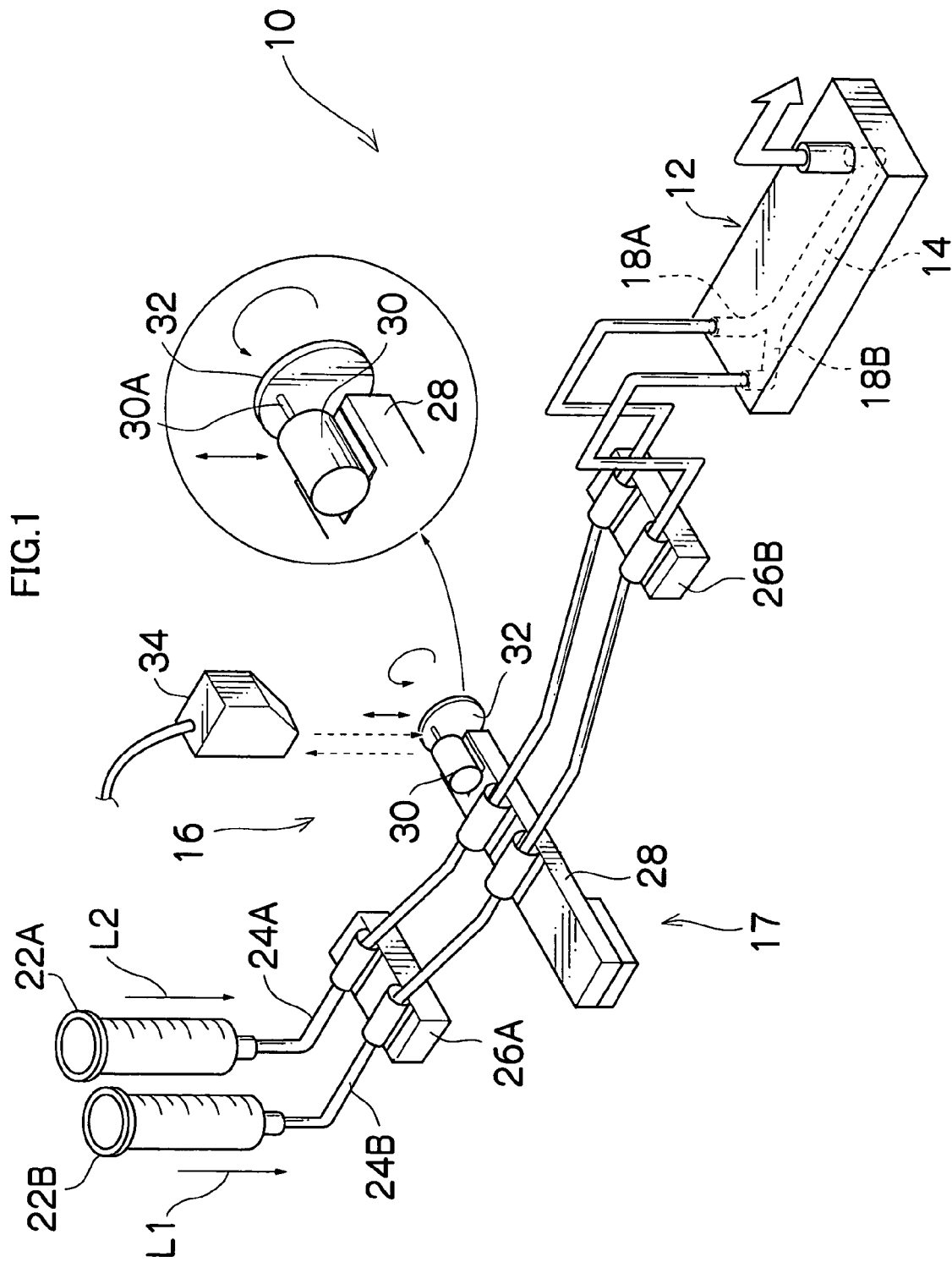
FIG. 1 is a conceptual drawing showing a configuration example of a micro device of the present invention.

FIG. 1 is a conceptual drawing showing an example of a micro device 10 according to the present invention, and the micro device 10 comprises a main body 12 of the micro device, and a velocity fluctuation induction device 16 to induce a velocity fluctuation in a microchannel longitudinal direction to fluids L1 and L2 which flow through the inside of a microchannel 14.

Figure 2:
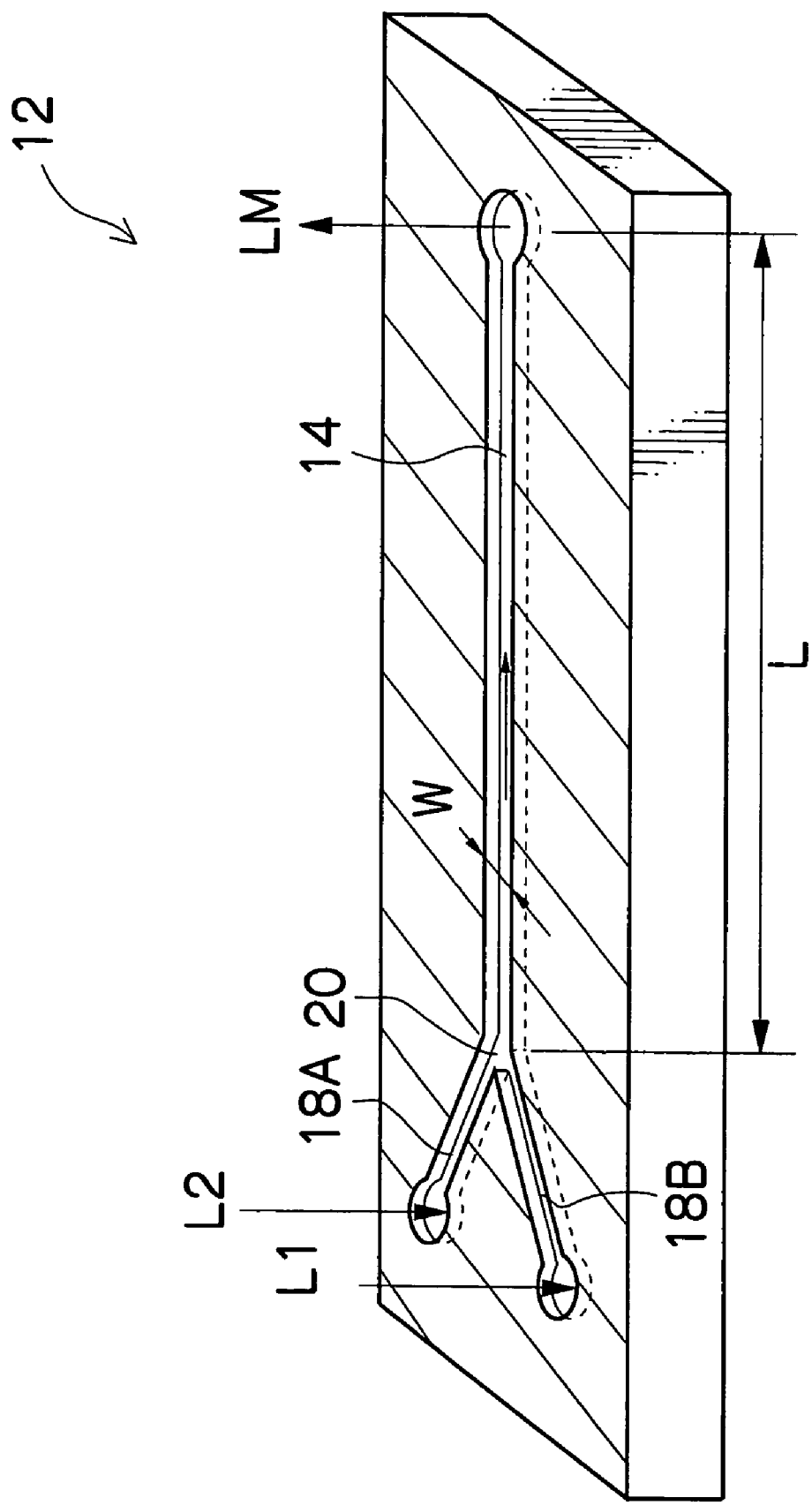
FIG. 2 is a crosswise sectional view of a main body of a micro device.

As shown in the crosswise cross section of FIG. 2, the main body 12 of the micro device is formed as a Y-shaped channel mainly by the microchannel 14 which makes a plurality of fluids L1 and L2 be mixed or perform a reaction accompanied by mixing with circulating the plurality of fluids L1 and L2 as a thin-film laminar flow, and two fluid supply passes 18A and 18B which supply the fluids L1 and L2 to the microchannel 14. Then, the fluids L1 and L2 supplied to the fluid supply passes 18A and 18B join into one microchannel 14 at a junction 20, and are made to perform a mixing reaction while being circulated as a thin film laminar flow for a mixing reaction liquid LM to be exhausted from an end of the microchannel 14. Although the number of fluid supply passes 18 is determined by the number of fluids which are made to perform a mixing reaction in a microchannel, an example of two types of fluids L1 and L2 will be explained in this embodiment. The fluids L1 and L2 also include a liquid, a gas, a solid-liquid mixture where metal fine particles etc. are dispersed in a liquid, a solid-gas mixture where metal fine particles are dispersed in a gas, and a gas-liquid mixture where a gas is dispersed in a liquid without the gas dissolving in the liquid. In addition, these include not only the case that types of the fluids L1 and L2 differ or chemical compositions differ, but also the case that states such as temperature and solid-liquid ratios differ.

The microchannel 14 is a channel-shaped minute space whose cross section in a radial direction is formed in a square, and the side length (W) of the square is formed in a range of at least 10 μm but no more than 1000 μm, and preferably a range of at least 10 μm and no more than 500 μm. In addition, the cross section of the microchannel 14 in the radial direction is not limited to the shape of a square, but a rectangular shape, a circle, or the like is sufficient. As a material of a wetted part of the main body 12 of the micro device, it is possible to use metallic materials such as iron, aluminum, stainless steel, titanium, and various alloys, resin materials such as a fluorocarbon resin, and an acrylic resin, and glass materials such as silicon, and glass.

As shown in FIG. 1, two syringes 22A and 22B for supplying the fluids L1 and L2 through the velocity fluctuation induction device 16 are provided in two fluid supply passes 18A and 18B of the main body 12 of the micro device.

The velocity fluctuation induction device 16 comprises two tubes 24A and 24B which connect the two fluid supply passes 18A and 18B, and the two syringes 22A and 22B, respectively, and an infralow frequency vibration generating device 17 which generates the infralow frequency vibration at a frequency of at least 50 Hz and less than 1 kHz in the tubes 24A and 24B. In addition, the infralow frequency vibration generating device 17 comprises a pair of supporting members 26A and 26B supporting the two tubes 24A and 24B in a longitudinal direction with keeping a gap, a vibrating beam 28 with cantilever structure which is provided between the pair of supporting members 26A and 26B and supports the two tubes 24A and 24B in air between the pair of above-described supporting members 26A and 26B, and a miniature motor 30 which is mounted in an end portion of the vibrating beam 28 and has a motor shaft 30A on which an eccentric weight 32 is installed. As shown in a partially enlarged drawing of FIG. 1, one portion of the eccentric weight 32 which shifts from a center of a disc-like weight is supported by the motor shaft 30A of the miniature motor 30. Thereby, when the eccentric weight 32 is rotated by the miniature motor 30, the miniature motor 30 and vibrating beam 32 integrally vibrate in directions shown by arrows in FIG. 1. Hence, it is possible to give mechanical vibration to the tubes 24A and 24B supported by the vibrating beam 32. In addition, devices to supply the fluids L1 and L2 to the main body 12 of the micro device are not limited to the syringes 22A and 22B, but devices may be ones of being able to supply a small amount of fluids L1 and L2.

Since the micro device 10 itself is an extremely small apparatus, it is necessary that the miniature motor 30 mounted on the micro device 10 is small and of low power consumption, and it is possible to preferably use a miniature motor 30 for models. In addition, the tubes 24A and 24B are preferably elastic materials which can perform smooth vibration when the tubes 24A and 24B vibrate between the pair of supporting members 26A and 26B, and it is possible to suitably use, for example, rubber tubes. In FIG. 1, reference numeral 34 designates a laser displacement gauge for measuring a displacement of the tubes 24A and 24B which vibrate through the vibrating beam 28, and obtaining a vibration frequency and horizontal (the same as a microchannel longitudinal direction) and vertical displacements of the tubes 24A and 24B from the measurements.

In order to implement the fluid mixing reaction enhancement method of the present invention by the micro device 10 constituted as mentioned above, it is necessary to mechanically vibrate the tubes 24A and 24B portions just before the fluids L1 and L2 are supplied to the main body 12 of the micro device in a vibration frequency of 50 Hz or more and 1 kHz or less by supplying the fluids L1 and L2 to the main body 12 of the micro device from the two syringes 22A and 22B through the two tubes 24A and 24B and vibrating the vibrating beam 28 by driving the miniature motor 30. Since the infralow frequency vibration propagates in the fluids L1 and L2, which flow through the inside of the microchannel 14, by the mechanical infralow frequency vibration of these tubes 24A and 24B, a velocity fluctuation is induced in the fluids L1 and L2 in a microchannel longitudinal direction. Owing to this velocity fluctuation, the mixing reaction of the fluids L1 and L2 which flow through the inside of the microchannel 14 is enhanced.

Figure 3:
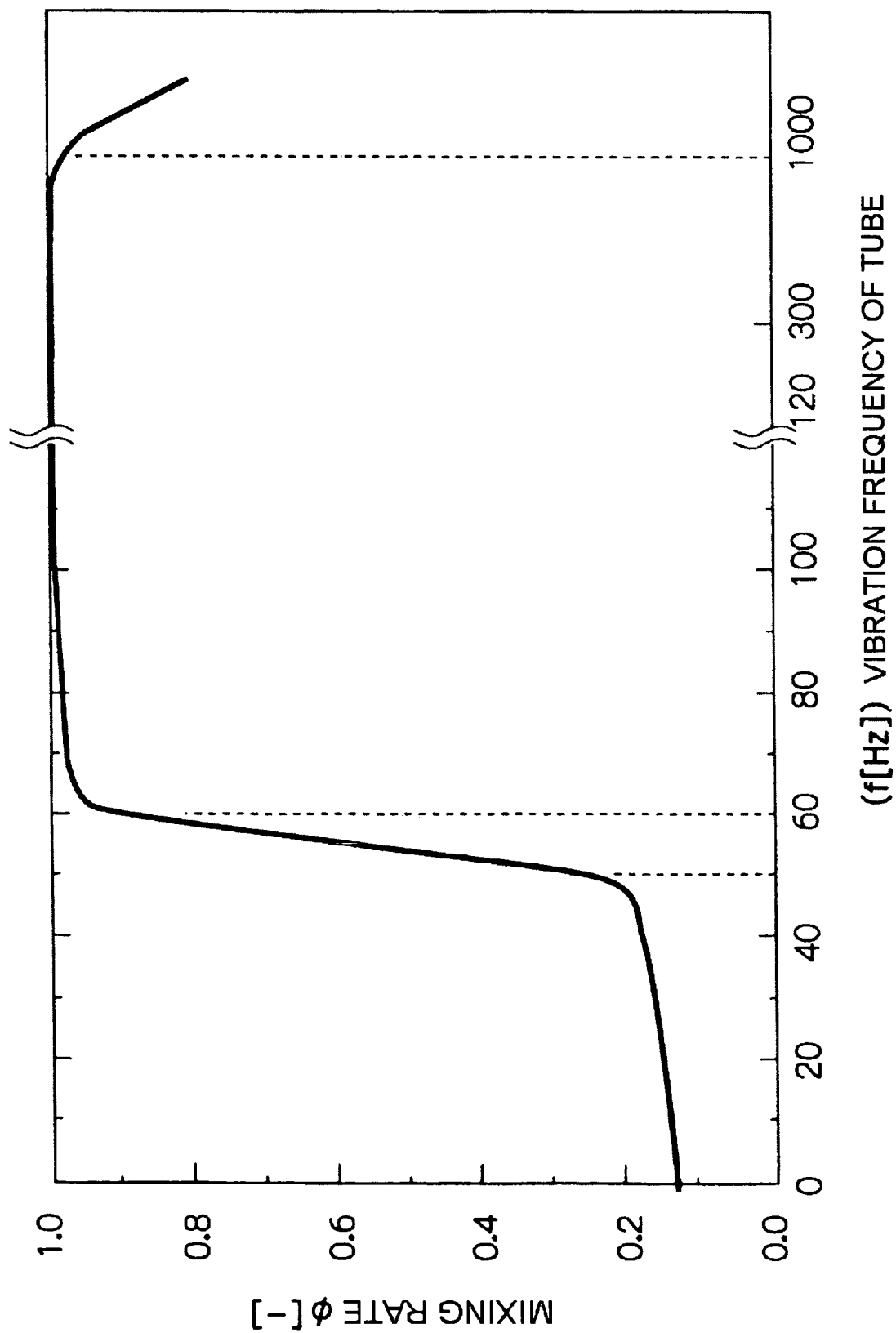
FIG. 3 is a relational graph of the vibration frequency of a tube, and mixing rate φ.

FIG. 3 shows a curve showing a relationship between the vibration frequency of the tubes 24A and 24B, and the mixing rate $\phi$ by using the above-mentioned micro device 10. As for the mixing rate $\phi$, digital processing was given to the momentary concentration distribution images measured with PLIF described later, where the case of being not mixed at all was made to be mixing rate $\phi$=0, and the case of being mixed thoroughly was made to be mixing rate $\phi$=1.

According to FIG. 3, a curve rises rapidly in the vicinity of 50 Hz and shows a state of approximately complete mixing in the vicinity of 60 Hz, when the vibration frequency of the tubes 24A and 24B is enlarged. The state of this complete mixing begins to drop when the frequency becomes 1 kHz or more. As shown by this result, it is possible to exponentially enhance the mixing rate $\phi$ of the fluids L1 and L2 by generating the infralow frequency vibration of 50 Hz or more and less than 1 kHz in the tubes 24A and 24B, propagating this infralow frequency vibration in the fluids L1 and L2 which flow through the inside of the microchannel 14, and inducing the velocity fluctuation in the microchannel longitudinal direction in the fluids L1 and L2 which flow through the inside of the microchannel 14. This is because it is not possible to obtain sufficient mixing performance since it is not possible to obtain large velocity fluctuation strength in the microchannel 14 because a vibration frequency is small even if vibration amplitude is large in the propagating vibration frequency of less than 50 Hz. On the contrary, in the vibration frequency of more than 1 kHz, for example, the supersonic vibration of some tens kHz, it is not possible to obtain sufficient mixing performance since it is not possible to obtain large velocity fluctuation strength in the microchannel 14 because vibration amplitude becomes extremely small even if the vibration frequency is high.

As long as it is an infralow frequency vibration generating source which can deliver the infralow frequency vibration at a frequency of at least 50 Hz and less than 1 kHz in fluids L1 and L2 which flow through the microchannel 14, it is also possible to use other devices such as an electromagnetic shaker which can perform ON-OFF operation at a constant frequency. Nevertheless, the miniature motor 30, and in particular, a miniature motor 30 for models is preferable. As a vibration source of the infralow frequency vibration mounted on the micro device 10, it is important that a vibration source is small and has low power consumption, and the miniature motor 30 for models satisfies these conditions. In addition, the miniature motor 30 for models can obtain a vibration frequency up to about 300 Hz. Hence, it is possible to obtain the vibration frequency necessary for mixing enhancement of the present invention in a simple structure like the above-mentioned velocity fluctuation induction device 16 when using the miniature motor 30 for models in 50 Hz or more and 300 Hz or less.

Next, test results will be explained, the test results which picked up as images how the mixed state of the fluids L1 and L2 in the microchannel 14 changed in the case that the velocity fluctuation induction device 16 gave vibration to the tubes 24A and 24B and the case that it did not.

The microchannel 14 of the main body 12 of the micro device which was tested was formed by a grooved stainless steel plate (500 μm in thickness) being sandwiched with acrylic plates (1000 μm in thickness). In addition, what was used as the microchannel 14 had a square cross section in the radial direction which had the side length of 500 μm, and had the length (L) of 80 mm in the longitudinal direction of the microchannel 14. Distilled water, and distilled water including a fluorescent dye of rhodamine between two types of fluids L1 and L2 were supplied from one syringe 22A and another syringe 22B, respectively to the microchannel 14 so as to reach the same flow rate (0.1 mL/minute per syringe). In the microchannel 14 at this time, a cross-sectional mean flow rate (U) was 13.3 mm/second and a Reynolds number Re was 6.6, and when vibration was not given, a flow formed in the microchannel 14 was a laminar flow.

Then, in a test of giving vibration to the tubes 24A and 24B, a stabilized DC power supply was used for driving the miniature motor 30. The vibration frequency of the vibrating beam 28 which supports the tubes 24A and 24B was changed from 17 Hz to 62 Hz by changing a voltage value, supplied to the miniature motor 30, from 0 V to 2.5 V. The peak magnitude of the tubes supported on the vibrating beam 28 at this time was 1.2 mm.

In addition, mixed states of the fluids L1 and L2 in the microchannel 14 in the case of not giving vibration to the tubes 24A and 24B and the case of giving the vibration were analyzed by measuring the momentary concentration distribution in the microchannel 14. In addition, the flow rate generated in the microchannel 14 by the vibration was measured, and the velocity fluctuation was obtained from the measurements.

Figure 4:
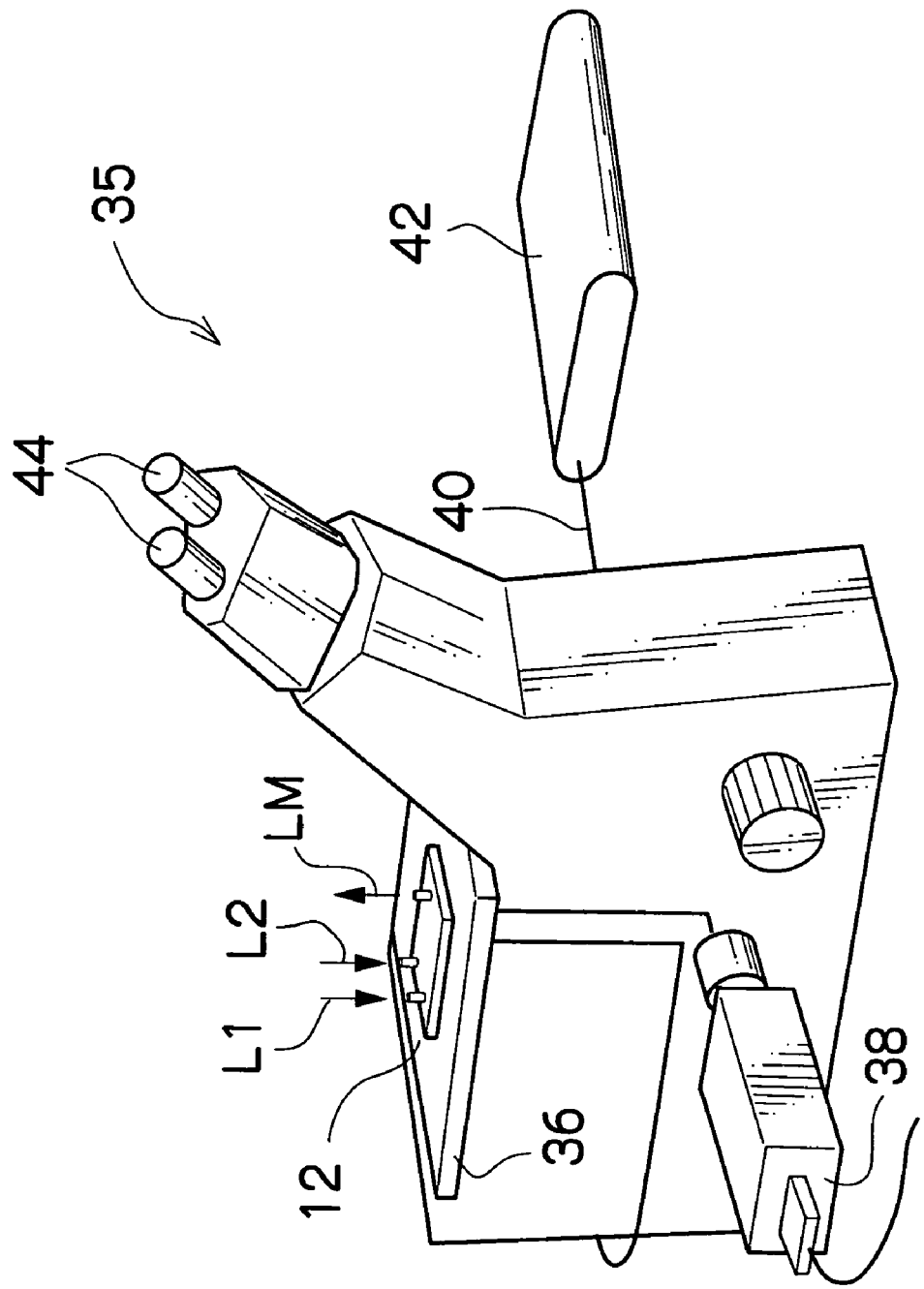
FIG. 4 is a schematic diagram of a measuring apparatus which measures the concentration distribution and momentary flow speed of a fluid in a microchannel.

FIG. 4 is a schematic diagram of a measuring apparatus 35 where PLIF (Planar Laser Induced Fluorescence Method: a concentration measurement method by a fluorescence method using a planar laser) which can obtain the concentration distribution and momentary flow rate of the fluids L1 and L2 in the microchannel 14 as two-dimensional information, and a micro PIV (Particle Image Velocimeter) are combined. The PLIF system was used for the measurement of a concentration field, and the micro PIV system was used for the measurement of a flow rate field in the microchannel 14. In FIG. 4, reference numeral 12 designates a main body of a micro device, reference numeral 36 designates a measurement stage on which the main body 12 of the micro device is placed, reference numeral 38 designates a CCD camera, reference numeral 40 designates an optical fiber, reference numeral 42 designates a light source, and reference numeral 44 designates a visual lens section. Also in any system, an Nd:YAG laser was used for the light source 42. The resolution of the CCD camera 38 was 1280×1024 (pixels), and an image pickup area was set in 0.9×0.7 mm. In the concentration measurement, as described above, distilled water and a rhodamine aqueous solution were supplied to the microchannel 14 as the fluid L1 from the syringe 22A and the fluid L2 from the syringe 22B respectively. On the other hand, in the flow rate measurement, distilled water in which tracer particles (polystyrene particles of a 0.96 μm diameter) were mixed was used as the fluids L1 and L2. Then, the concentration measurement and flow rate measurement were performed in a position which was 50 mm downstream from the junction 20 of the Y-shaped channel described above. Fifty images were taken with the CCD camera 38 at 1 Hz of sampling frequency, and were recorded in a computer (not shown). By statistically performing the digital processing of these images by using PIV software, the concentration distribution and velocity fluctuation of the fluids L1 and L2 which flowed through the inside of the microchannel 14 were obtained.

Figure 5A:
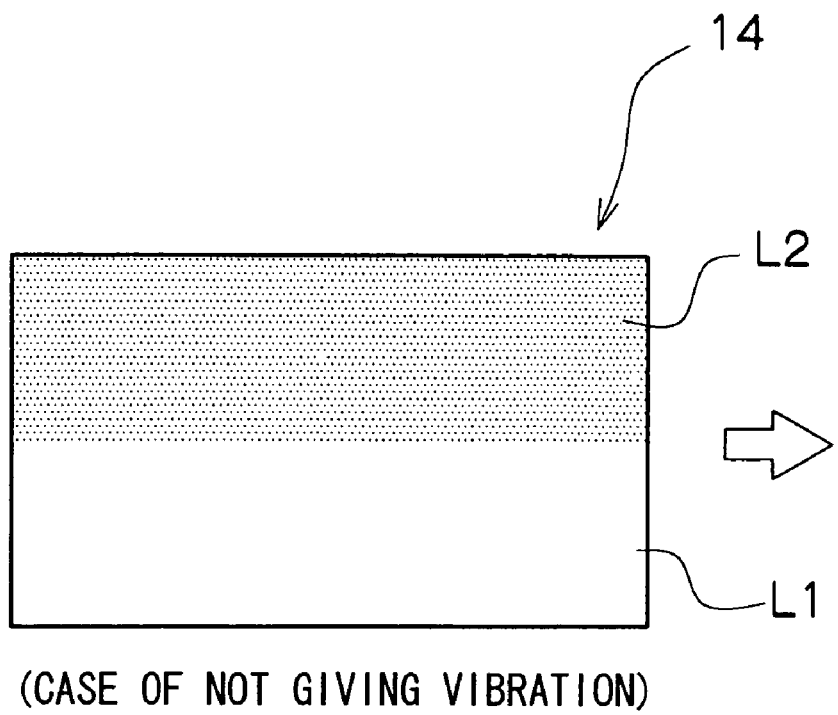
FIG. 5A is a diagram showing a mixed state in a microchannel when vibration is not given to tubes.
Figure 5B:
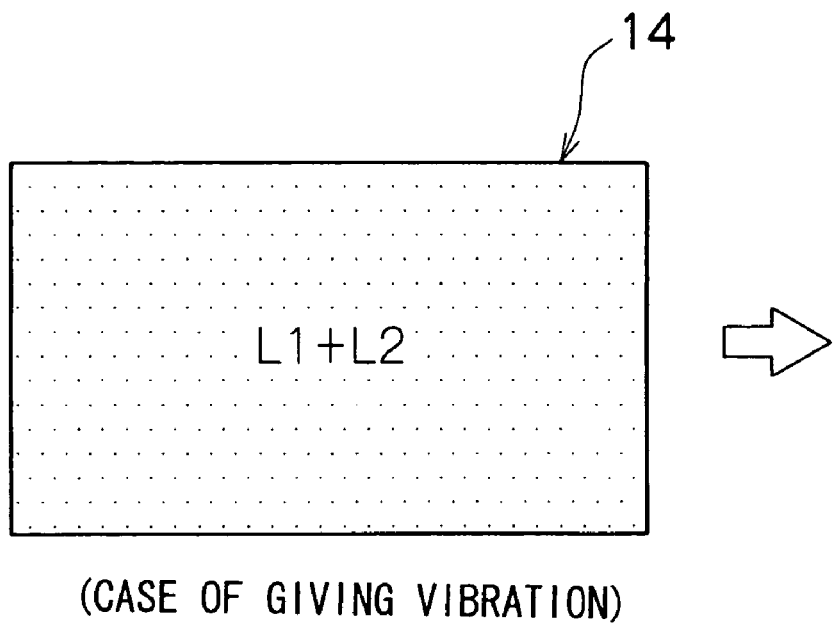
FIG. 5B is a diagram showing a mixed state in the microchannel at the time of generating vibration in the tubes and propagating the vibration in fluids which flow through the microchannel.

In the result of the above-mentioned test, FIG. 5A is a diagram showing a mixed state in the microchannel 14 when vibration is not given to the tubes 24A and 24B, and FIG. 5B is a diagram showing a mixed state in the microchannel 14 at the time of generating vibration in the tubes 24A and 24B and propagating the vibration at 60 Hz in the fluids L1 and L2 which flow through the microchannel 14.

As shown by these diagrams, the fluids which flowed through the inside of the microchannel 14 were thoroughly separated into two layers shown in white (fluid L1) and black (fluid L2) when vibration was not given to the tubes 24A and 24B. On the contrary, when the 60-Hz vibration was generated in the tubes 24A and 24B and the 60-Hz vibration was delivered in the fluids L1 and L2 which flowed through the microchannel 14, two types of fluids L1 and L2 which flowed through the inside of the microchannel 14 in one layer were mixed thoroughly as shown in one layer as a whole. In addition, although not illustrated, when 17-Hz vibration was generated in the tubes 24A and 24B and the 17-Hz vibration was delivered in the fluids L1 and L2 which flowed through the microchannel 14, the fluids L1 and L2 were hardly mixed similarly to the case that vibration was not given to the tubes 24A and 24B.

In this way, according to the mixing reaction enhancement method using the micro device 10 of the present invention, the velocity fluctuation in the microchannel longitudinal direction is induced in the fluids L1 and L2 by propagating the infralow frequency vibration at the vibration frequency of 50 Hz or more and less than 1 kHz in the fluids L1 and L2 which flow through the inside of the microchannel 14. Hence, it is possible to exponentially enhance the mixing of the fluids L1 and L2 which flow through the inside of the microchannel 14. Hence, it is possible to exponentially enhance the mixing and reaction of the fluids L1 and L2, which flow through the inside of the microchannel 14, without complicating the microchannel structure or extending the microchannel 14.

In this embodiment, the infralow frequency vibration was delivered in the fluids L1 and L2, which flowed through the inside of the microchannel 14, by vibrating the tubes 24A and 24B. Nevertheless, it is also sufficient to deliver the above-described infralow frequency vibration in the fluids L1 and L2 which flow through the inside of the microchannel 14 by directly vibrating the main body 12 of the micro device, that is, the microchannel 14 itself. In addition, it is possible to obtain the better mixing rate φ by vibrating all the plurality of tubes 24A and 24B. Nevertheless, even when vibrating one of the plurality of tubes 24A and 24B, it is possible to obtain the good mixing rate φ compared to the case of not vibrating.

By the way, the mixing of the fluids L1 and L2 which flow through the inside of the microchannel 14 is enhanced by propagating the infralow frequency vibration in the fluids L1 and L2 which flow through the inside of the microchannel 14, and inducing the velocity fluctuation in the microchannel longitudinal direction in the microchannel 14 as described above. Nevertheless, a mixing effect receives large influence also by a vibration frequency. Hence, in order to develop the mixing reaction enhancement technology in the micro device 10, it is important to measure the concentration and flow rate in the microchannel in sufficient accuracy, and to quantify the measurements. In addition, it is possible to use the micro device 10 under various mixing conditions or reaction conditions for various kinds of fluids L1 and L2, whose physical properties differ, as described above. But, when the fluid mixing method of the present invention is performed, it is expected that the mixing rate φ is not fixed and changes depending on the types of the fluids L1 and L2 and operating conditions. Accordingly, if it is possible to quantitatively obtain the mixed state in the microchannel 14 and to control the vibration frequency within the above-mentioned range of at least 50 Hz and less than 1 kHz to the optimum conditions on the basis of the obtained result, it is possible to optimize the enhancement of the mixing reaction.

From this, in order not only to evaluate a parameter which directly governed the mixing performance of the fluids L1 and L2 which flowed through the inside of the microchannel 14, but also to quantify a relationship between the parameter and mixing rate φ, the present inventor investigated the relationship between the velocity fluctuation strength of fluids L1 and L2, which flowed through the inside of the microchannel 14, in the microchannel longitudinal direction, and the mixing rate φ, and the relationship between the vibration speed variation strength of tubes 24A and 24B, and the mixing rate φ.

With letting the velocity fluctuation of fluids in the microchannel longitudinal direction at time t which was measured with the micro PIV be $u_f(t)$, the velocity fluctuation strength in the microchannel longitudinal direction is defined in the following formula (1) expressing the velocity fluctuation strength in the square root of a time mean of square of $u_f(t)$:

$$\sqrt{\overline{u_f^2}}. \qquad (1)$$

In addition, with letting a horizontal speed variation of the tubes 24A and 24B and vertical speed variation of the tubes 24A and 24B, which are obtained by performing time differentiation of displacements of the tubes 24A and 24B in a horizontal direction (the same as a microchannel longitudinal direction) and a vertical direction respectively, be $u_t(t)$ and $v_t(t)$ respectively, the vibration speed variation strength of the tubes 24A and 24B is defined in the following formula (2) expressing the vibration speed variation strength in the square root of the sum of time means of square of $u_t(t)$ and square of $v_t(t)$:

$$\sqrt{\overline{u_t^2} + \overline{v_t^2}}. \qquad (2)$$

In addition, the vibration speed variation strength of the tubes 24A and 24B was obtained from the measurements by the above mentioned laser displacement gauge. In addition, the velocity fluctuation strength and vibration speed variation strength which are shown by the above-mentioned formulas (1) and (2) are transformed into dimensionless strength by the cross-sectional mean flow rate (U) in the microchannel 14.

Figure 6:
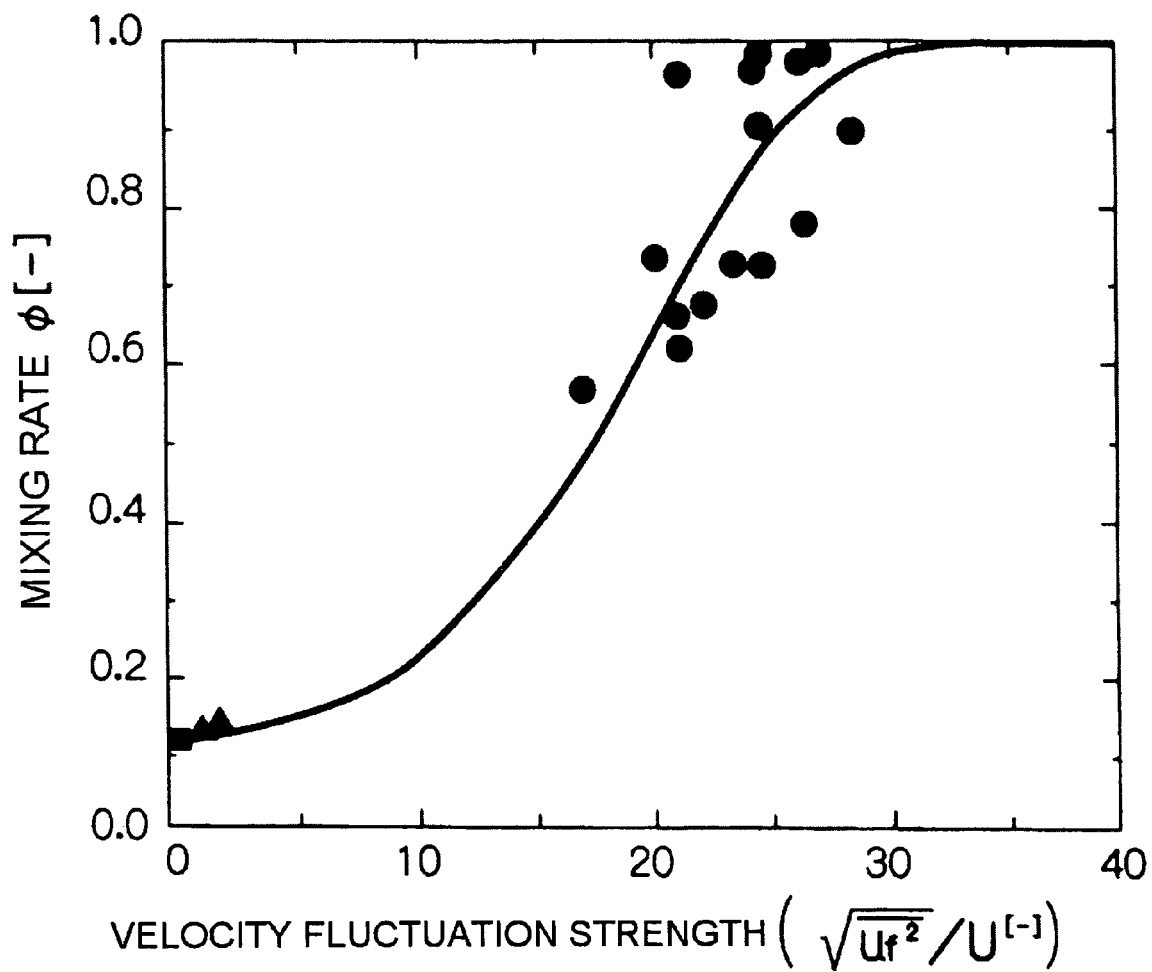
FIG. 6 is a relational graph of the velocity fluctuation strength of fluids, which flow through the inside of the microchannel, in a microchannel longitudinal direction, and the mixing rate φ.

FIG. 6 shows a relationship between the velocity fluctuation strength of fluids L1 and L2, which flow through the inside of the microchannel 14, in the microchannel longitudinal direction, and the mixing rate φ. Black dots (●) in FIG. 6 show the case that the tubes 24A and 24B are vibrated at 50 to 62 Hz, and marks (▲) show the case that the tubes 24A and 24B are vibrated at 17 to 20 Hz or are not at all vibrated.

Clearly from FIG. 6, there is a close relationship between the velocity fluctuation strength in the microchannel longitudinal direction, which is induced by the vibration of the tubes 24A and 24B, and the mixing rate φ. Hence, when the tubes 24A and 24B are not vibrated, or the vibration frequency is 20 Hz or lower and the velocity fluctuation strength is small, the mixing rate φ is about 0.1, and the fluid L1 and L2 which flow through the inside of the microchannel 14 are hardly mixed. On the other hand, when the vibration frequency became 50 Hz, which was the lower limit of the vibration frequency of the present invention, or more, the velocity fluctuation strength increased, and the rapid rise of the mixing rate φ was seen with the increase in velocity fluctuation strength. The velocity fluctuation further rose near the vibration frequency of 60 Hz, and the state near the complete mixing in mixing rate φ=1 was obtained.

As shown in this result, the parameter which directly governs the mixing rate φ of the fluids L1 and L2 which flow through the inside of the microchannel 14 is the velocity fluctuation strength in the microchannel longitudinal direction. As the velocity fluctuation strength becomes large, not only the mixing rate φ becomes large, but also the velocity fluctuation strength is influenced by the vibration frequency delivered in the fluids L1 and L2. Then, it becomes possible to quantitatively evaluate the mixed state in the microchannel 14 by obtaining this velocity fluctuation strength. Hence, when the vibration frequency is controlled to the optimum conditions within a range of the frequency which is not less than 50 Hz and less than 1 kHz so that the evaluated velocity fluctuation strength can be maximized, it is possible to attain the optimization of the mixing reaction enhancement. In this case, from FIG. 6, the vibration frequency may be controlled so that the velocity fluctuation strength divided by a mean flow rate (U) in a cross section of the microchannel for a dimensionless analysis may become 25 or more, and preferably, 30 or more.

Figure 7:
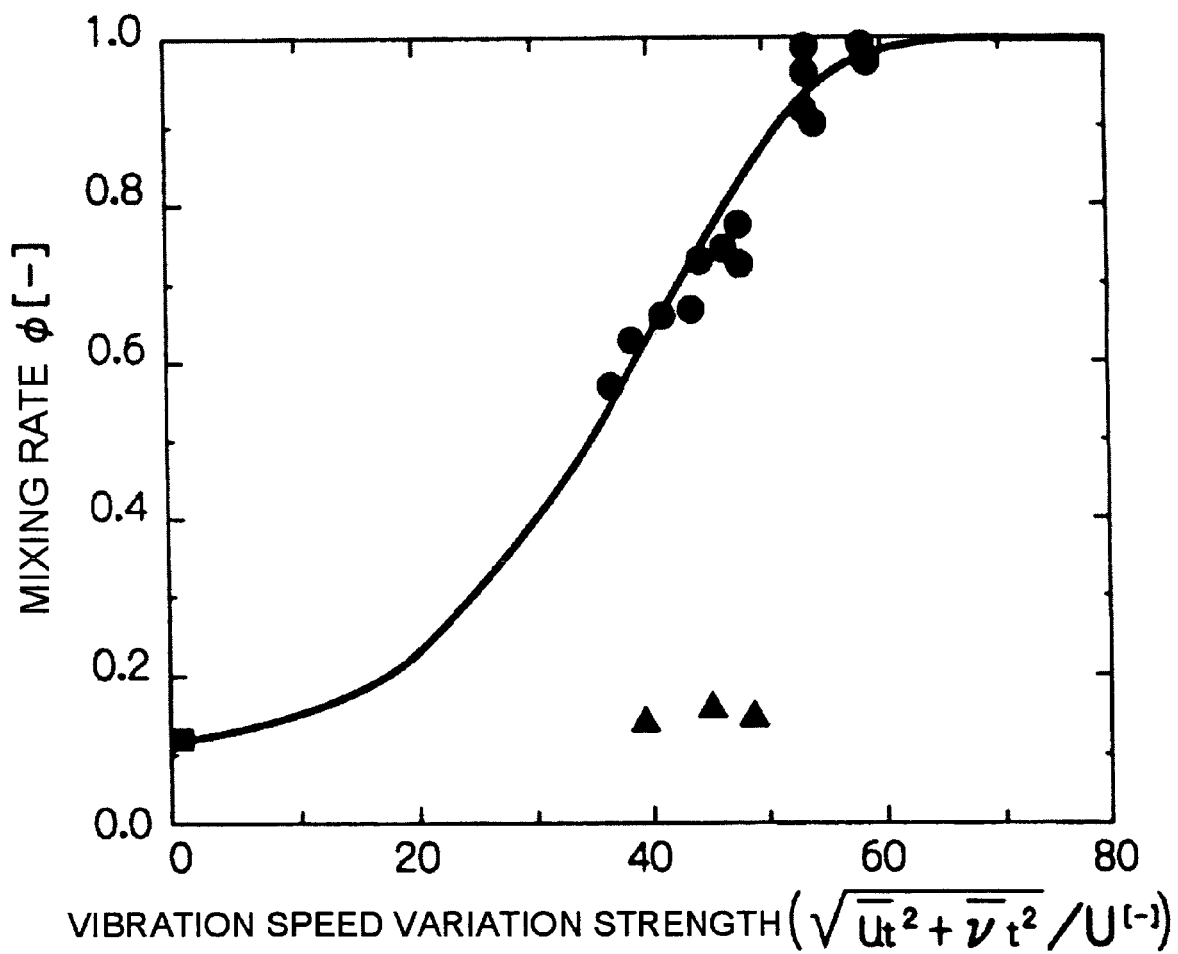
FIG. 7 is a relational graph of the vibration speed variation strength of tubes, and the mixing rate φ.

FIG. 7 shows a relationship between the vibration speed variation strength of the tubes 24A and 24B, and the mixing rate φ. Black dots (●) in FIG. 7 show the case that the tubes 24A and 24B are vibrated at 50 to 62 Hz, and marks (▲) show the case that the tubes 24A and 24B are vibrated at 17 to 20 Hz or are not at all vibrated.

Figure 8:
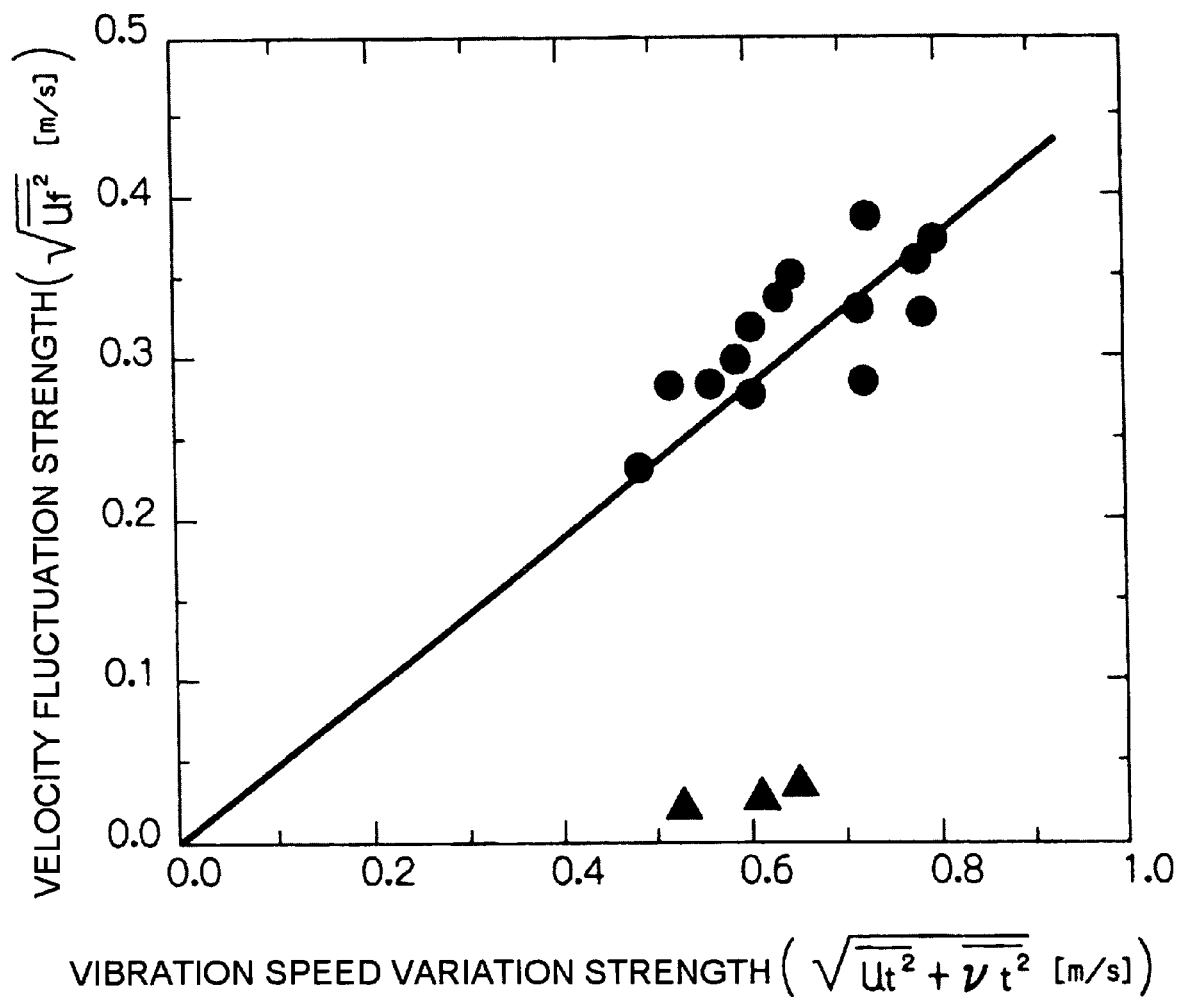
FIG. 8 is a relational graph of the velocity fluctuation strength and vibration speed variation strength.

As shown in FIG. 7, it is found that there is a correlation between the vibration speed variation strength of the tubes 24A and 24B, and the mixing rate φ at the vibration frequency of 50 Hz or more, the correlation which is the same as that in FIG. 6. Namely, since the velocity fluctuation does not become large in the case of not vibrating the tubes 24A and 24B, and the case of the vibration frequency being 20 Hz or less, the mixing rate φ does not become large with being largely different from the case of 50 Hz or more even if the vibration speed variation strength is approximately the same. In this point, although the velocity fluctuation strength is suitable as the parameter expressing the mixing rate φ more adequately, the vibration speed variation strength is also sufficiently usable as the parameter of the mixing rate φ since the vibration speed variation strength also has a close relationship to the mixing rate φ in the vibration frequency of 50 Hz or more which the present invention needs. In addition, as shown in FIG. 8, since having a close correlation to the velocity fluctuation strength in 50 Hz or more (●), the vibration speed variation strength is sufficiently usable as the parameter of the mixing rate φ also from this point. By the way, each of the marks ▲ designates the case of 20 Hz or less.

Hence, when the vibration frequency is controlled to the optimum conditions within a range of the frequency which is not less than 50 Hz and less than 1 kHz so that the evaluated vibration speed variation strength can be maximized, it is possible to attain the optimization of the mixing enhancement. In this case, from FIG. 7, the vibration frequency may be controlled so that the vibration speed variation strength divided by a mean flow rate (U) in a cross section of the microchannel for a dimensionless analysis may become 50 or more, and preferably, 60 or more.

In addition, the above-mentioned present embodiment shows an example of the micro device and fluid mixing enhancement method, and in short, in a micro device which makes a plurality of fluids mixedly reacted by joining these fluids into one microchannel through each fluid supply pass, what is necessary is that the micro device and fluid mixing enhancement method can induce velocity fluctuation in a microchannel longitudinal direction in fluids by propagating infralow frequency vibration at an vibration frequency of at least 50 Hz and less than 1 kHz to the fluids which flow through the inside of the microchannel.

Although the embodiments of the present invention have been described with reference to the accompanying drawings, it will be understood by those skilled art that the present invention can be implemented in other specific forms without modifying the technical spirit and essential features of the present invention. Therefore, it should be understood that illustrated exemplary embodiments are not limitative but only illustrative in all aspects.

What is claimed is:

1. A fluid mixing reaction enhancement method using a micro device which makes a plurality of fluids mixedly reacted by joining the fluids into one microchannel through each of a plurality of fluid supply passes, comprising:
   providing said microchannel; and
   inducing a velocity fluctuation in a microchannel longitudinal direction in the fluids by propagating infralow frequency vibration at a vibration frequency of at least 50 Hz and less than 1 kHz to the fluids which flow through an inside of the microchannel,
   wherein an opening width of the microchannel is at least 10 μm and not more than 1000 μm;
   said method further comprising:
   inducing velocity fluctuation in fluids which flow through the inside of the microchannel by vibrating a tube coupled to the fluid supply passes;
   quantitatively evaluating a mixed state in the microchannel based on a vibration speed variation strength of a tube, the vibration speed variation strength defined by the square root of a sum of time means of square of $u_t(t)$ and square of $v_t(t)$:

$$\sqrt{\overline{u_t^2} + \overline{v_t^2}}$$

where $u_t(t)$ and $v_t(t)$ represent, respectively, horizontal speed variation of the tube and vertical speed variation of the tube, which are obtained by performing time differentiation of displacements of the tubes in a horizontal direction and a vertical direction respectively; and based on the evaluation result, controlling the vibration frequency within a range of the frequency which is at least 50 Hz and less than 1 kHz so that the velocity fluctuation strength can be maximized.

2. The method according to claim 1, wherein the vibration frequency is between 100 Hz and 300 Hz.

3. The method according to claim 1, wherein said range is between 100 Hz and 1 kHz.

4. A micro device which has a microchannel and which makes a plurality of fluids mixedly reacted by joining these fluids into said microchannel after passing the fluids through each of a plurality of fluid supply passes,
   said micro device comprising; and
   a velocity fluctuation induction device which induces a velocity fluctuation in the microchannel longitudinal direction in fluids which flow through an inside of the microchannel,
   wherein the velocity fluctuation induction device comprises:
   a plurality of tubes which are connected to said plurality of fluid supply passes respectively, and supply fluids to the fluid supply passes respectively; and
   an ultra low frequency vibration generating device which generates ultra low frequency vibration of a frequency which is at least 50 Hz and less then 1 kHz in at least one of the plurality of tubes,
   wherein an opening width of the microchannel is at least 10μm and not more than 1000 μm;
   wherein the ultra low frequency vibration generating device comprises:
   a pair of supporting members which supports at least one tube among the plurality of tubes in a longitudinal direction with the tubes spaced at a predetermined gap;
   a vibrating beam with cantilever structure which is provided between the pair of supporting members and supports the at least one tube in midair; and
   a miniature motor which is mounted in a front-end part of the vibrating beam and around a motor shaft of which an eccentric weight is installed, and wherein mechanical vibration is given to the at least one tube, supported by the vibrating beam, by integrally vibrating the miniature motor with the vibrating beam by rotating the eccentric weight by the miniature motor.

5. The micro device according to claim 4, wherein said frequency is between 100 Hz and 1 kHz.

* * * * *